United States Patent [19]

Fukatani

[11] Patent Number: 4,982,824
[45] Date of Patent: Jan. 8, 1991

[54] FLUID CLUTCH

[75] Inventor: Yasunobu Fukatani, Neyagawa, Japan

[73] Assignee: Kabushiki Kaisha Daikin Seisakusho, Neyagawa, Japan

[21] Appl. No.: 304,988

[22] PCT Filed: Mar. 9, 1988

[86] PCT No.: PCT/JP88/00247
§ 371 Date: Oct. 24, 1988
§ 102(e) Date: Oct. 24, 1988

[87] PCT Pub. No.: WO88/07635
PCT Pub. Date: Oct. 6, 1988

[30] Foreign Application Priority Data

Mar. 30, 1987 [JP] Japan .................................. 62-78479

[51] Int. Cl.$^5$ .................. F16D 25/0635; F16D 25/04
[52] U.S. Cl. .................. 192/85 AB; 192/88 A
[58] Field of Search .................. 192/70, 70.28, 85 A, 192/85 AB, 88 A

[56] References Cited

U.S. PATENT DOCUMENTS

| 1,564,717 | 12/1925 | Scruby et al. | 192/70 X |
| 2,106,472 | 1/1938 | Aikman | 192/85 AB |
| 2,621,769 | 12/1952 | Cardwell et al. | 192/88 A |
| 2,765,061 | 10/1956 | Fawick | 192/88 A |
| 2,805,744 | 9/1957 | Cardwell et al. | 192/88 A |
| 2,941,642 | 6/1960 | Smoll | 192/88 A |
| 3,326,344 | 6/1967 | Hackforth | 192/88 A |
| 3,651,909 | 3/1972 | Zautaszwili | 192/88 A |
| 3,750,787 | 8/1973 | Link | 192/85 AB |
| 4,335,808 | 6/1982 | Johnson | 192/85 AB |

Primary Examiner—Richard Lorence
Attorney, Agent, or Firm—Armstrong, Nikaido, Marmelstein, Kubovcik & Murray

[57] ABSTRACT

This invention is applicable to an automobile air clutch. An output side clutch disc (54) is disposed between an input side flywheel (50) and an annular plate (53) integral with the flywheel, two friction facings (60) of the clutch disc (54) are connected by a fluid actuator (59), and the friction facings (60) are moved in their axial direction by expansion or contraction of the actuator (59) so as to engage or disengage a clutch. In this way, reduction in overall dimension of clutch and prevention of faulty cut-off of clutch can be accomplished.

4 Claims, 2 Drawing Sheets

FLUID CLUTCH

TECHNICAL FIELD

This invention relates to a fluid clutch such as an air clutch in which a pneumatic actuator is applied to a clutch disc.

BACKGROUND ART

A conventionally known ordinary air clutch has a structure as illustrated in FIG. 4.

In FIG. 4 an automotive air clutch is applied to a flywheel 10. A clutch cover 12 is secured to flywheel 10, and a pressing force generated by an annular pneumatic actuator 14 in clutch cover 12 is transmitted to pressure plate 16 so as to press and hold in clutch disc 18 in between the pressure plate 16 and the flywheel 10.

The clutch disc spline fits onto an input shaft 20 of a transmission (not shown) disposed at a rear stage of the air clutch. A cylindrical shaft 24 fits onto an outer periphery of the input shaft 20 through a bushing 22. The clutch cover 12 fits onto a right end in the figure of the cylindrical shaft 24.

A right end of the cylindrical shaft 24, as viewed in FIG. 4, is surrounded by a cover 26. Chamber 28 is formed inside of the cover 26. Two air seals 30a & 30b are installed between the cover 26 and the cylindrical shaft 24, to prevent air leakage described later in details.

A control valve 32, operated by a clutch pedal 31, is interconnected to the cover 26 so that compressed air, flowing from a compressor 34 through a pressure regulator valve 36 by means of control of the control valve 32 (inching valve), is passed through a chamber 38 provided between the air seals 30a and 30b and through an inlet port 40 of the cylindrical shaft 24 to a passage 42. An outlet port 44 is interconnected to a left end of the passage 42, and the outlet port 44 is interconnected through a passage 46 formed in a thick wall of the clutch cover 12 to an air chamber 48 of the pneumatic actuator 14.

Such conventional embodiment includes problems in that its construction is complicated and the clutch disc 18 is difficult to disengage from the pressure surface of the flywheel 10 and a sharp disengagement of clutch can not be obtained.

An object of the invention is to solve the above problems and to provide a fluid clutch for carrying out clutch engagement/disengagement operation with a pneumatic actuator at the clutch disc.

DISCLOSURE OF THE INVENTION

This invention provides a fluid clutch, in which an annular plate facing the flywheel to which an engine power is transmitted is secured to the flywheel with a specified distance left therebetween, a clutch disc coupled to an output shaft is positioned between the flywheel and the annular plate, and an actuator is disposed at an outer peripheral part of the clutch disc, and is expanded or contracted by means of a circulation of fluid so as to engage two friction facings with or disengage such friction facings from the flywheel and the annular plate. The friction facings are therefore engaged with or disengaged from the flywheel and the annular plate by means of the expansion or the contraction of the pneumatic actuator.

A mechanism for sliding the pressure plate by a pneumatic force of the actuator becomes unnecessary so that the construction of clutch becomes simple.

At the time of clutch disengagement, because the actuator is contracted by a spring force of a return spring to cause the friction facings to be disengaged from pressure surfaces possible contact of one side of the clutch disc (FIG. 4) with the flywheel 10 is eliminated.

BEST MODE FOR CARRYING OUT THE INVENTION

Figure 1:
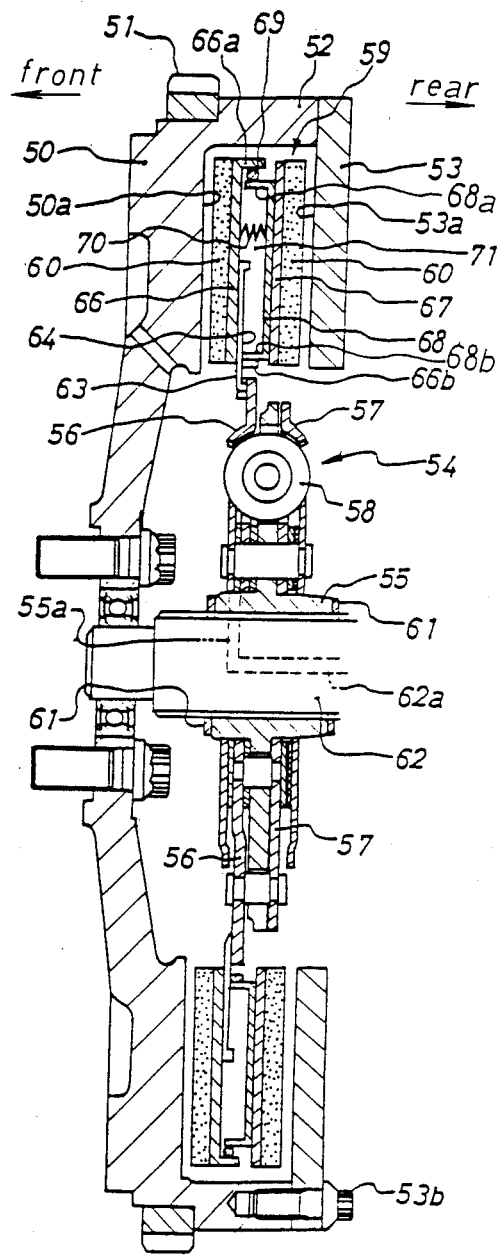
FIG. 1 is a vertical sectional view of an air clutch showing an embodiment of the invention.

In FIG. 1, showing one embodiment the air clutch according to the present invention, flywheel 50 is connected to a rear end of the crank shaft of an engine not shown. Ring gear 51 is welded to an outer peripheral part of the flywheel 50. Annular plate 53 is secured by bolts 53b to a rear end face of a peripheral edge 52 formed over the entire circumference of the outer peripheral part of flywheel 50. Accordingly, a distance between a pressure surface 50a of the flywheel 50 and a pressure surface 53a of the annular plate 53 is substantially constant. Annular plate has a comparatively large thickness and also serves as the clutch cover.

A clutch disc 54 is disposed between the pressure surface 50a and the pressure surface 53a. The clutch disc 54 is composed of a hub 55, a clutch plate 56, a retaining plate 57, a torsion spring 58, an actuator 59 and friction facings 60 etc. In the first place, the hub 55 is connected to an output shaft 62 by front and rear snap rings 61 so as not to slide in its axial direction. The actuator 59 which is an essential part of the invention is installed at a radial out side of the clutch plate 56 through a driven plate 63. Pipes 64 are formed on circumferential plural places of the driven plate 63, and said control valve 32 (FIG. 4) is interconnected to these pipes 64 through a passage 62a in the output shaft 62 and a passage 55a of the hub 55. Consequently, an air for expanding and contracting the actuator 59 is passed through these pipes 64. Incidentally, a part for supplying the compressed air to said passage 62a has an approximately same structure as FIG. 4 and pressure oil obtained by hydraulic means may be utilized in place of the compressed air.

Acutator 59 is formed of an annular cup 66 a backing plate 67, an annular cap 68, an O-ring 69 and a return spring 70. The actuator 59 is adapted to be expanded and contracted by the compressed air passed to an air chamber 71.

The annular cup 66 is formed into an annular shape having a flange 66a at its outer peripheral part. The front side friction facing 60 is secured to cup 66 by a bonding agent. The annular cap 68 is installed freely slidingly in the axial direction in such a manner as fronting on the annular cup 66, and is secured to the rear side friction facing 60 through backing plate 67. The O-ring 69 is interposed between an outside flange 68a of the annular cap 68 having an approximately U-shape section and the flange 66a. The rubber seal lip 66b secured to the driven plate 63 presses on an inside flange 68b at its inner peripheral part so as to maintain an air tightness of the air chamber 71.

Figure 2:
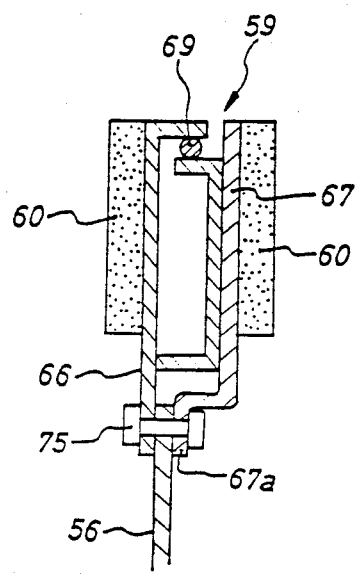
FIG. 2.

The return spring 70 contacting with the annular cup 66 and the annular cap 68 at its both ends is installed in the air chamber 71, so that it can isolate the two friction facings 60 from the pressure surface 50a and 53a to return them to respective initial states at the time of clutch disengagement wherein the compressed air is not supplied to the air chamber 71, as illustrated in FIG. 2.

Function will be described hereunder. In this embodiment, the actuator 59 is expanded in the axial direction by the compressed air supplied through the passages 62a and 55a and the pipes 64 to the air chamber 71 so as to press the two friction facings 60 on the pressure surfaces 50a and 53a. The pressing force of the actuator 59 is stopped by the thick annular plate 53 secured to the flywheel 50 and the annular plate 53 is hardly deflected by the pressing force of the clutch.

Figure 4:
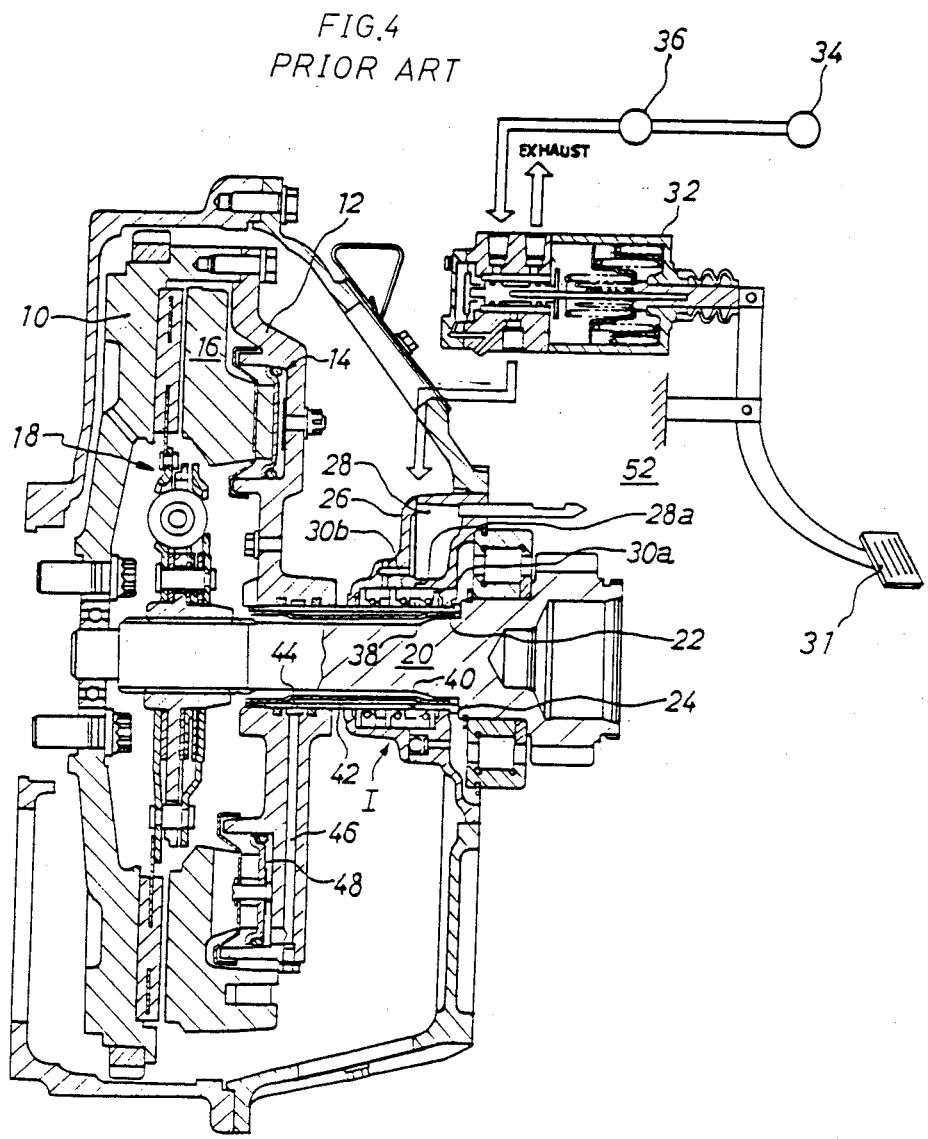
FIG. 4 is a schematic structural view of conventional embodiment.

At the time of clutch disengagement, the compressed air is discharged from the passage 62a by means of the control valve 32 of FIG. 4 and the actuator 59 is contracted by means of the spring force of the return spring 70, so that the friction facings 60 leave the pressure surfaces 50a and 53a to cut off the clutch. Therefore, the conventionally encountered trouble that one-side of the clutch disc 18 (FIG. 4) is kept pressed on the flywheel 10, is eliminated.

Not being limited to the structure as illustrated by FIG. 1, the actuator 59 may be formed into a structure wherein the driven plate 63 and the annular cup 66 are fastened by a rivet 75 and an inner peripheral part 67a of the backing plate 67 is fastened together by the rivet 75 so as to return the actuator 59 by an elasticity of the backing plate 67.

Figure 3:
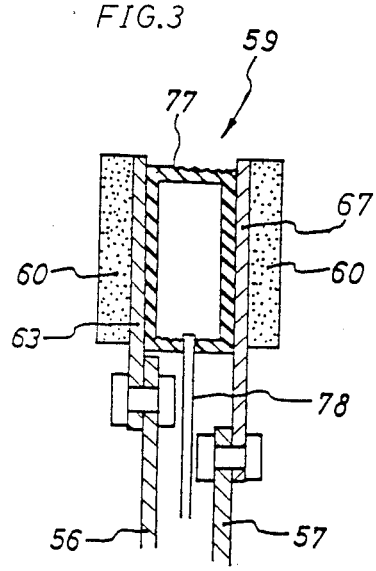
FIG. 3 are vertical sectional views of essential parts of another embodiments.

Further, as illustrated in FIG. 3, the backing plate 67 is connected to the retaining plate 57 (FIG. 1) by rivets 76 and a bellows 77 is interposed between the driven plate 63 and the backing plate 67, so that the compressed air may be passed through a pipe 78 to the bellows 77.

INDUSTRIAL APPLICABILITY

As described above, the fluid clutch according to the present invention is compact in its size and can avoid the faulty cut-off of clutch so that it is useful when applied to the automobile air clutch.

What is claimed is:

1. A fluid clutch assembly comprising a flywheel to which engine power is transmitted, an annular plate secured to said flywheel with a fixed distance therebetween, an output shaft in axial alignment with the axis of rotation of said flywheel, a clutch disc having a splined hub splined to said output shaft, snap rings at the opposite ends of said hub engaged in circumferential grooves in said output shaft and fixing said clutch disc in fixed axial position on said output shaft, said clutch disc having a clutch plate and a retaining plate, rigid annular discs on opposite sides of said clutch plate and positioned between said flywheel and said annular plate, said rigid annular discs having friction facings of friction material attached to said rigid annular discs for engagement with said flywheel and said annular plate, respectively, and fluid actuator means disposed at an outer peripheral portion of said clutch disc between said rigid annular disc and said friction facings thereon for engaging and disengaging said friction facings on said rigid annular discs with said flywheel and said annular plate, respectively.

2. A fluid clutch as set forth in claim 1, in which one of said rigid annular discs is an annular cup secured to said clutch plate and the other of said rigid annular discs is an annular cap, said annular cap being fitted in said annular cut and being freely slidable therein in an axial direction of said cup and said cap and forming a compressed air chamber therebetween, an expandable return spring between said annular cup and said annular cap, said compressed air chamber being interconnected through a control valve to a compressor for actuating said fluid clutch.

3. A fluid clutch as set forth in claim 1, in which one of said rigid annular discs is an annular cup secured, at it radial inner end portion, to one side of the radially outer portion of said clutch plate and having one friction facing of said friction facings secured thereto and the other of said rigid annular discs is an annular cap fitted into said annular cup and freely slidable therein and secured to the other side of the radially outer portion of said clutch plate by a resilient backing plate, said annular cup and said annular cap forming a compressed air chamber therebetween, said resilient backing plate being secured at one of its sides to said annular cap and at its other side to another of said friction facing of said friction facings and a compressor connected to said air chamber through a control valve for feeding compressed air to said compressed air chamber for engaging said friction facings with said flywheel and said annular plate and for disengaging said friction facings from said flywheel and said annular plate, said resilient backing plate biasing said friction facings to a disengaged position.

4. A fluid clutch as set forth in claim 1, in which one of said rigid annular discs is secured at an inner peripheral portion to an outer peripheral portion of said clutch plate, the other of said annular discs is secured at an inner peripheral portion to an outer peripheral portion of said retaining plate, said friction facings of said friction material are fixed to said annular discs at the flywheel side and annular plate sides of said respective annular discs, an expandable bellows is interposed between said annular discs and a compressor, through a control valve, is connected to said bellows for feeding compressed air to said bellows to expand said bellows and engage said clutch and for discharging compressed air from said bellows and release said clutch.

* * * * *